Jan. 15, 1946.  G. H. DOWTY  2,392,905
RETRACTABLE MOUNTING FOR AIRCRAFT LANDING ELEMENTS
Filed Nov. 16, 1942  2 Sheets-Sheet 1

Inventor,
GEORGE H. DOWTY,
By Reynolds & Beach
Attys

Jan. 15, 1946.  G. H. DOWTY  2,392,905
RETRACTABLE MOUNTING FOR AIRCRAFT LANDING ELEMENTS
Filed Nov. 16, 1942  2 Sheets-Sheet 2

Inventor,
GEORGE H. DOWTY,
By Reynolds & Beach
Attys

Patented Jan. 15, 1946

2,392,905

UNITED STATES PATENT OFFICE 2,392,905

RETRACTABLE MOUNTING FOR AIRCRAFT LANDING ELEMENTS

George Herbert Dowty, Cheltenham, England

Application November 16, 1942, Serial No. 465,742
In Great Britain November 19, 1941

3 Claims. (Cl. 244—102)

The present invention relates to retractable mountings for aircraft landing elements.

It is an object of the present invention to provide a satisfactory form of aircraft landing element mounting of which the length can be varied in the course of retraction.

A further object of the invention is to provide an aircraft retractable landing element mounting which is of greater overall length in its extended condition than it is in the fully-retracted condition in order to provide a large ground clearance such as will permit the utilisation of a large-diameter airscrew and by the effective shortening during retraction not impose restriction upon the designer as a result of the necessity for housing an excessively long mounting in the retracted condition.

Yet a further object of the invention is to provide a satisfactory form of retractable mounting in slender form so as to permit the housing of the mounting in a stowage space of shallow dimensions, such for example as in a thin wing section.

Other objects and advantages of the invention will be apparent during the course of the following description.

In the accompanying drawings forming part of this specification and in which like numerals are employed to designate like parts throughout the same:

Figure 2 is an end elevation of the mounting shown in Figure 1, the chain-line position of Figure 2 being the extended postion, whereas the full-line position in Figure 2 shows the mounting in the position which it occupies when fully retracted; while

Figure 1:
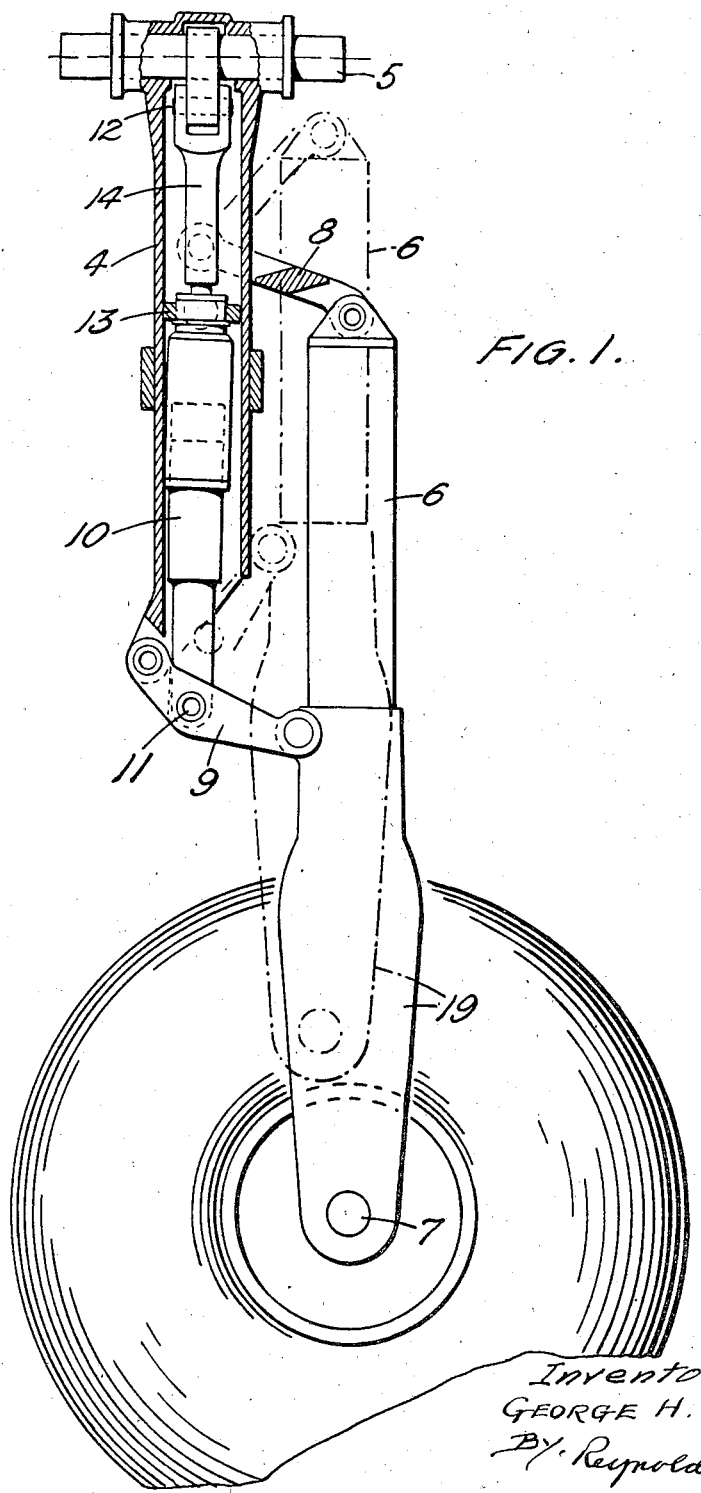
Figure 1 is a side elevation partly in section illustrating an aircraft landing element mounting according to the present invention.

Referring now to the drawings, the undercarriage leg illustrated therein comprises the part 4, which, whilst being retractably mounted for swinging about the retraction pivot 5 fixed on the aircraft structure, is non-yieldable under landing and taxiing loads. The yieldable leg part 6 mounts the landing element spindle 7, and is itself connected to the non-yieldable leg part 4 by the pivoted links 8 and 9. The arrangement thus ensures that the pivoted links 8 and 9 define with the parts of the legs 4 and 6 between the link pivots thereon a deformable frame; the nature of the deformation which occurs under landing and taxiing loads being made apparent by comparison between the full-line and chain-line positions illustrated for the yieldable leg part 6, in regard to which it can be assumed that the full-line position shows the leg in the fully-extended condition, whereas the chain-line position shows the leg part 6 fully deflected under some maximum load condition.

In order to provide resilient resistance to deformation of the frame which results from yield of the yieldable leg part 6 under landing and taxiing loads, a telescopic shock-absorber 10 of any convenient form is pivotally connected between a pin-joint 11 on the link 9 intermediate the pivotal connections of the link to the leg parts 4 and 6, and a fixed shock-absorber anchorage constituted by the pivot 12 and link 14 pivotally connected to such pivot and to the normally fixed upper element of the shock-absorber.

In the construction illustrated the non-yieldable leg part 4 has been shown hollow, the shock-absorber being slidably located in the interior of the hollow leg by the collar 13; the arrangement further being such that the shock-absorber can partake of a certain amount of angular movement with respect to the axis of the tubular leg part 4 as the deformable frame yields under landing and taxiing loads.

As shown in the drawings, it can be assumed that the mounting is retractable sideways, in which event the retraction pivot 5 extends substantially fore and aft, retraction being achieved by operation of the remotely-controllable jack 15 which operates between a pin-joint 16 on the fixed leg part 4 and a pin-joint 17 on some convenient fixed anchorage 18.

Figure 2:
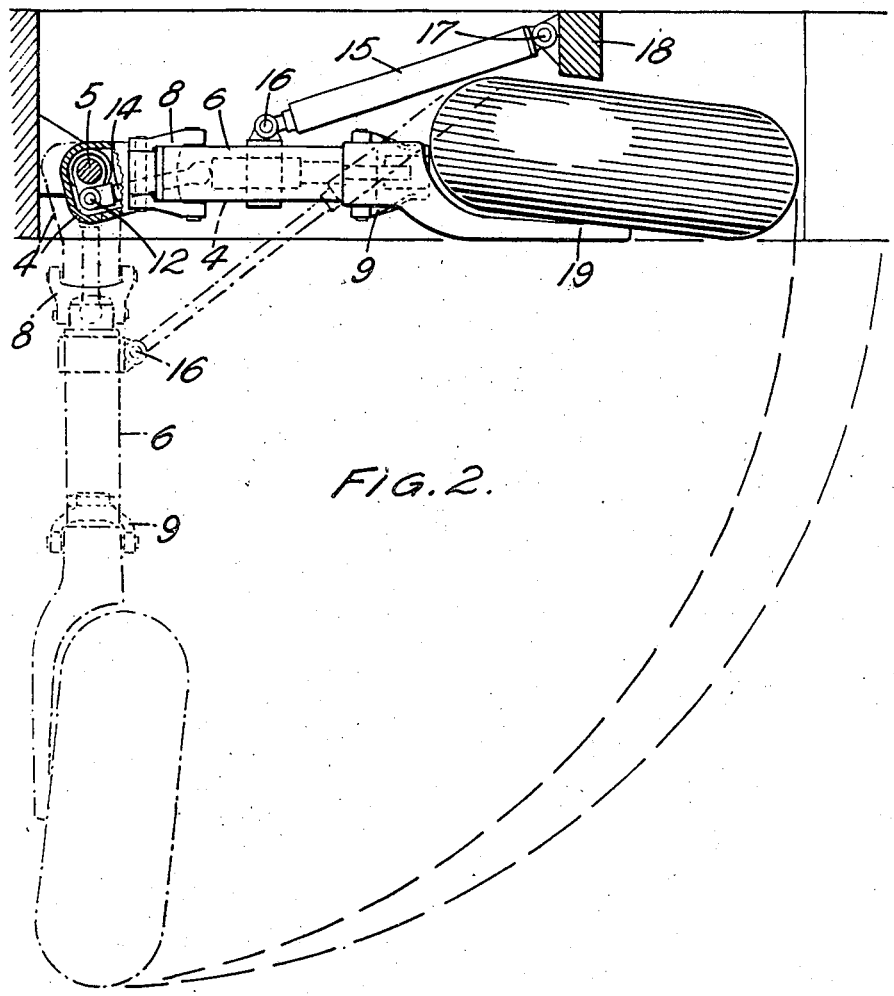
Figure 3:
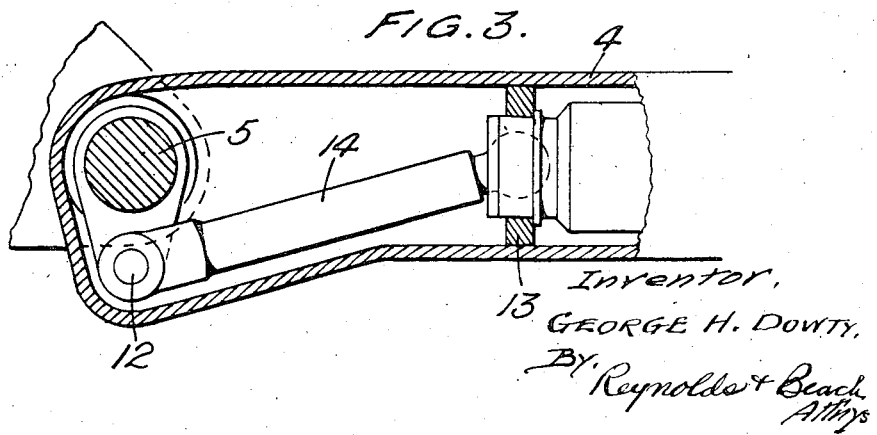
Figure 3 is an enlarged detail sectional elevation showing the retraction pivot and shock-absorber anchorage.

Referring now particularly to Figures 2 and 3, it will be noted that with the mounting in its fully-extended condition the retraction pivot 5 and the shock-absorber anchorage 12 are substantially aligned with the axis of the fixed leg part 4; or in other words with the axis of the shock-absorber 10. On the other hand, when the mounting is retracted to the full-line position as shown in Figure 2, the alignment is disturbed, with the result that the shock-absorber is drawn in during the course of the retraction operation, thereby pulling inward the link 9, and moving the leg part 6 to the chain-line position of Figure 1, until the overall length of the mounting is reduced to the intended minimum in the fully-retracted condition.

It is conceivable that a situation may arise where a mounting might be required to be shorter when extended than it is in the retracted condition. A typical requirement for such a construction would for instance arise in a case where normal retraction without variation in length of the mounting would bring the wheel or other landing element into such a position that it would foul a spar or boom, which fouling could be avoided by lengthening the mounting during retraction. For lengthening the mounting during retraction, the anchorage of the shock-absorber would need to be out of alignment between the shock-absorber and the retraction pivot in the extended condition of the mounting, and, conversely, the shock-absorber aligned with a line joining the shock-absorber anchorage and the retraction pivot in the retracted condition, which arrangement is of course the exact opposite of that previously described for shortening the leg during retraction.

In addition to the alternatives of effective shortening during retraction and extension, a further possibility may arise in that a shortening or lengthening may be required independently of retraction movement. Thus, if the mounting is in its fully-extended condition and it is desired to lower the aircraft to facilitate performance of some servicing operation, provision may be made for turning the retraction pivot as a whole in order to disturb its alignment with the shock-absorber anchorage and the axis of the shock-absorber; the reverse procedure being adopted in cases where a lengthening is required instead of shortening.

Modifications may be made without departing from the scope of the invention; for example, it will be noted that the landing element spindle is supported unilaterally by the supporting bracket 19, such unilateral mounting being preferable from the point of view of enabling the mounting to be kept as thin as possible, but if it were necessary or desirable the landing element spindle could be bilaterally supported by a forked bracket embracing the landing element to engage both ends of the spindle.

What I claim is:

1. An aircraft landing element mounting comprising a leg part non-yielding under landing and taxiing loads, pivot means supporting said leg part for swinging between an upright landing position and a retracted position, a second leg part generally parallel to and yieldably movable lengthwise relative to said non-yielding leg part, substantially parallel links spaced apart lengthwise of said leg parts, pivotally connected to both of said leg parts and operable to guide said second leg part for lengthwise movement relative to said non-yielding leg part under landing and taxiing loads, a shock-absorber including two telescoping shock-absorber elements disposed generally parallel to said leg parts, anchor means including a pivot axis fixed in parallel vertically spaced relationship to the pivot axis of said non-yielding leg part, and operatively connected to one of said shock absorber elements to hold the latter fixed relative to said non-yielding leg part while parts are in landing position, means pivotally connecting the other shock-absorber element to one of said links intermediate its pivotal connections to said two leg parts, by resilient relative movement of the shock absorber elements to resist swinging of said link and consequent lengthwise movement of said second leg part relative to said non-yielding leg part under landing and taxiing loads, said anchor means, by reason of the offset relationship of its pivot axis, being operable to shift both shock-absorber elements conjointly relative to said non-yielding leg part as the latter is swung upwardly, to swing the link connected to said shock-absorber for effecting lengthwise movement of said second leg part relative to said non-yielding leg part to alter the composite length of said two leg parts.

2. An aircraft landing element mounting comprising a leg part non-yielding under landing and taxiing loads, pivot means supporting said leg part for swinging between an upright landing position and a retracted position, a second leg part disposed alongside and substantially parallel to said non-yielding leg part, and movable lengthwise relative to said non-yielding leg part, substantially parallel links spaced apart lengthwise of said leg parts, pivotally connected to both of said leg parts and operable to guide said second leg part for lengthwise movement relative to said non-yielding leg part under landing and taxiing loads, a shock-absorber including two telescoping shock absorber elements disposed generally parallel to said leg parts, anchor means, including an anchor pivot fixed in spaced parallel relationship below the pivot axis of said non-yielding leg part, and connected to one of said shock-absorber elements to hold the latter, when in landing position, fixed relative to said non-yielding leg part, the other shock-absorber element being pivotally connected to one of said links intermediate its pivotal connections to said two leg parts, by resilient relative movement of the shock-absorber elements to resist swinging of said link and consequent lengthwise movement of said second leg part relative to said non-yielding leg part under landing and taxiing loads, the anchor means, by reason of its spacing from the pivot axis of the non-yielding leg part, during retracting swinging of said non-yielding leg part effecting shifting of both shock-absorber elements conjointly relative to said non-yielding leg part, and toward the latter's pivot means, thereby to swing the link connected to said shock-absorber for effecting lengthwise movement of said second leg part relative to said non-yielding leg part, to reduce the composite length of said two leg parts.

3. An aircraft landing element mounting comprising a tubular leg part non-yielding under landing and taxiing loads, pivot means supporting said leg part for swinging between an upright landing position and a retracted position, a second leg part disposed alongside and substantially parallel to said non-yielding leg part and movable lengthwise relative to said non-yielding leg part, said leg parts being arranged lengthwise to dispose a substantial portion of their lengths in overlapping relationship, substantially parallel links spaced apart lengthwise of said leg parts, the upper link being pivotally connected to the central portion of said non-yielding leg part and to the upper portion of the second leg part, and the lower link being connected to the central portion of the second leg part, passing below the lower end of said non-yielding leg part, and connected to the side of said non-yielding leg part remote from said second leg part, to define a frame of substantially parallelogram shape deformable for lengthwise movement of said second leg part relative to said non-yielding leg part under landing and taxiing loads, a shock-absorber including two telescoping shock-absorber elements received within said tubular non-yielding leg part, an anchor pivot fixed in spaced parallel relationship below the pivot axis of said non-yielding leg part, an anchor link pivotally connected to said anchor pivot and to the nearer shock-absorber element, normally to hold such shock-absorber element fixed relative to said non-yielding leg part, means pivotally connecting the other shock-absorber element to the lower of said parallel links at a location intermediate the pivotal connection of such link to said two leg parts, by resilient relative movement of the shock-absorber elements to resist deformation of such parallelogram frame and consequent lengthwise movement of said second leg part relative to said non-yielding leg part under landing and taxiing loads, said anchor link being swingable by retracting swinging of said non-yielding leg part to shift both shock-absorber elements conjointly relative to said non-yielding leg part toward said non-yielding leg part pivot means, to swing the link connected to said shock absorber for effecting lengthwise movement of said second leg part relative to said non-yielding leg part to reduce the composite length of said two leg parts.

GEORGE HERBERT DOWTY.